United States Patent [19]

Root

[11] Patent Number: 5,280,289
[45] Date of Patent: Jan. 18, 1994

[54] AUTOMATIC SIGNAL THRESHOLDING SYSTEM

[75] Inventor: George R. Root, Huntington Beach, Calif.

[73] Assignee: Hughes Aircraft Company, Los Angeles, Calif.

[21] Appl. No.: 872,482

[22] Filed: Apr. 23, 1992

[51] Int. Cl.⁵ .............................................. G01S 7/34
[52] U.S. Cl. .................................... 342/91; 342/92
[58] Field of Search .................. 342/91, 90, 92, 93, 342/159

[56] References Cited

U.S. PATENT DOCUMENTS

| | | | |
|---|---|---|---|
| 3,838,422 | 9/1974 | MacArthur et al. | 342/93 |
| 4,044,352 | 8/1977 | Wilmot | 342/89 |
| 4,431,993 | 2/1984 | Van Der Mark | 342/91 |
| 4,459,592 | 7/1984 | Long | 342/93 |
| 4,550,318 | 10/1985 | Prengaman et al. | 342/90 |
| 4,684,950 | 8/1987 | Long | 342/94 |
| 4,862,177 | 8/1989 | Wong | 342/160 |
| 4,894,658 | 1/1990 | Hecht-Nielsen et al. | 342/90 |
| 5,070,335 | 12/1991 | Lewis et al. | 342/90 |

*Primary Examiner*—John B. Sotomayor
*Attorney, Agent, or Firm*—Michael W. Sales; Wanda K. Denson-Low

[57] ABSTRACT

An automatic thresholding target detection system operable in high clutter, noisy environments provides target recognition through the generation of automatic signal thresholds. Infrared and radar detectors scanning an environment detect radiant energy from manmade and natural sources. The energy received is converted to electrical signals representative of the varying energy intensities which are filtered and compared with a computed target signal threshold. Signal spikes having amplitudes greater than the automatically generated threshold are then evaluated using a shape parameter test. Finally, an automatic region clutter recognition processor confirms that the spike is a true target, clutter or noise.

21 Claims, 10 Drawing Sheets

AUTOMATIC SIGNAL THRESHOLDING SYSTEM

STATEMENT OF GOVERNMENT RIGHTS

This invention was made with Government support under Government Contract No. F04701-87-C-0024 awarded by the Air Force. The Government has certain rights in this invention.

BACKGROUND OF THE INVENTION

The present invention relates to target detection, and more particularly to target detection using an automatic threshold system in infrared (IR) and radar detectors to differentiate between targets and clutter in high noise environments.

One application for large imaging arrays is in scanning sensors for detecting and locating the onset of a radiative event in a cluttered or noisy environment. For example, a satellite-based sensor array can be used to scan a region on earth to detect missile or spacecraft launchings or nuclear tests. The sensors detect radiated energy in for example the infrared spectrum and electrical signals are generated by the scanning sensors. Electrical signals of sufficient amplitude would represent targets, or bright spots of radiative energy.

A key problem in infrared and radar systems is the need to detect the electrical signals caused by legitimate radiating targets and reject those caused by noise or background clutter. This is differentiation process is classically accomplished by "thresholding". A predetermined threshold is compared to the received signal. If the amplitude of the electrical signal is greater than the threshold then a target has been detected.

Known methods and systems for computing signal thresholds typically partition the geographic area scanned into a number of "threshold zones". A different threshold value is then computed for each zone. Every point within a given zone gets the same threshold value. This method works well when the noise statistics are approximately constant over the entire zone. However, this threshold zone method does not provide reliable data when radiative clutter is present.

Clutter occurs when portions of the zone scanned are very "noisy" or bright while other areas are very "quiet" or dark. Noisy areas occur when the sensor receives non-target generated radiation from the earth's atmosphere or from natural radiating elements on the earth's surface such as bodies of water. Additionally, man-made radiation from manufacturing processes or weapon detonations would also produce false targets as viewed by a scanning sensor.

The computed threshold value is driven up by the noisiest portion of the zone. This results in very poor probability of target detection for targets near clutter areas. The method of computing threshold values is typically to count the number of threshold exceedances (false detections) for each zone on one or more frames of data and then compute the threshold value needed to achieve the desired false detection rate. The computed threshold value is not applied until the next frame so that there is a lag in response to changing noise or clutter conditions.

When counting threshold exceedances, present thresholding methods cannot distinguish between exceedances caused by noise, and those exceedances which may be caused by true targets. The sudden appearance of a large number of targets may cause thresholds to be raised resulting in poor target detection probability. The technique commonly used to prevent this event is to further delay application of the computed threshold until some outside intelligence such as a human operator, determines whether the signal threshold should be raised or not.

Disadvantages of the known zone thresholding systems and method include: poor overall performance near clutter; poor performance in rapidly changing noise conditions (for example during battle field counter-measure) and required human intervention to set or adjust thresholds.

SUMMARY OF THE INVENTION

The present invention provides for highly efficient target detection in a high clutter environment through the use of an automatic signal thresholding system. A detector receives energy radiated from outside of the system and generates at least one output signal representative of the detected energy. The generated electrical signal is filtered, producing at least one filtered output signal having both positive and negative signal values. A target signal threshold is generated by; determining the most negative value of the filtered output signals, smoothing the varying values of these most negative signals so that the variation from sample to sample is reduced, and computing the target signal threshold using constants chosen to achieve a desired probability of detection and the value of the most negative signal. The most positive signal peak is compared to the target signal threshold. A peak in excess amplitude of the threshold is a potential target. A peak less than the amplitude of the threshold is a candidate for clutter or noise.

The filtered output signals can also be compared by their shape to a known range of shapes for the filtered output signal. The width of the amplitude spike can determine if the spike is noise, clutter or a legitimate target.

An alternative embodiment of the invention allows the automatic thresholding system to change its operating conditions dependent upon the likelihood that the area being scanned is likely to contain clutter.

Methods of target detection are also described.

BRIEF DESCRIPTION OF THE DRAWINGS

These and other aspects of the invention will be fully described in the following Detailed Description of the Invention taken in conjunction with the drawings wherein.

DETAILED DESCRIPTION OF THE INVENTION

This invention is a system for the detection of true targets in high noise environments. The automatic thresholding system examines signals produced by a DC rejection filter commonly used in IR and radar signal processing systems. Based upon those signals, and an a priori knowledge of the expected signals caused by true targets, a threshold value which will eliminate most non-target signals such as those causes by noise, background clutter, radiation induced noise spikes may be computed.

Additionally, this system incorporates in one embodiment a controlled incremental increase of the computed threshold in response to bright target environments. An alternative embodiment teaches the counting of the number of samples which exceed threshold value.

This automatic thresholding system is operable with both infrared sensors and radio frequency systems. This automatic thresholding system computes threshold value so that the amplitude of background noise does not exceed the known threshold value but target signals do. This thresholding system allows hardware to be reduced in size. Implementing this system in hardware means that it runs much faster than when implemented in software. It is a method that is particularly applicable to systems with high data rates.

In one specific application of this technology this invention provides infrared detection signal processing for satellite based systems observing earth bound missile launches. The same system has applicability to FLIR (Forward Looking Infrared) systems used in conventional aircraft.

The bright light from an energy emitting object such as the tail of a missile competes, when viewed by a satellite in space, with other bright lights radiating from the earth. These natural reflective, radiating bodies produce "clutter". Clutter such as city lights, or the reflection from the surface of a body of water can be easily confused with actual targets in the same detection area.

Scanning sensors within the satellite scan the earth scenes target and background. The scanning sensors contain DC rejection filters. These filters remove the average value of the signal passing only the variation about the means value. A target signal produces a signal spike of great amplitude which exceeds a threshold. We examine the negative signal to directly compute the threshold. A 4:1 ratio of negative peak to positive peak is characteristic of targets compared to clutter noise for which the ratio of positive and negative peak amplitudes is 1:1.

The advantages of the automatic thresholding system include: threshold values are computed in "real time" so they can change rapidly in response to changing noise or clutter conditions thereby maintaining a low rate of false detections for widely varying noise and clutter conditions; rapid change in threshold permits target detection very near to severe clutter or countermeasures, and the presence of targets does not cause a significant rise in threshold so excellent probability of target detection is maintained.

The inclusion of a signal "shape" test in addition to the threholding operation is an additional concept, one which reduces the false detection rate by a large factor while having very little affect on target detection.

Lower false detection rates mean lower processing power and computing resources are needed to implement the system. The shape test examines the size or extent of the positive portion of the signal. Specifically, a narrow shape indicates a potential spike, a moderate shape indicates a potential target while a broad shape indicates likely clutter.

Figure 1A:
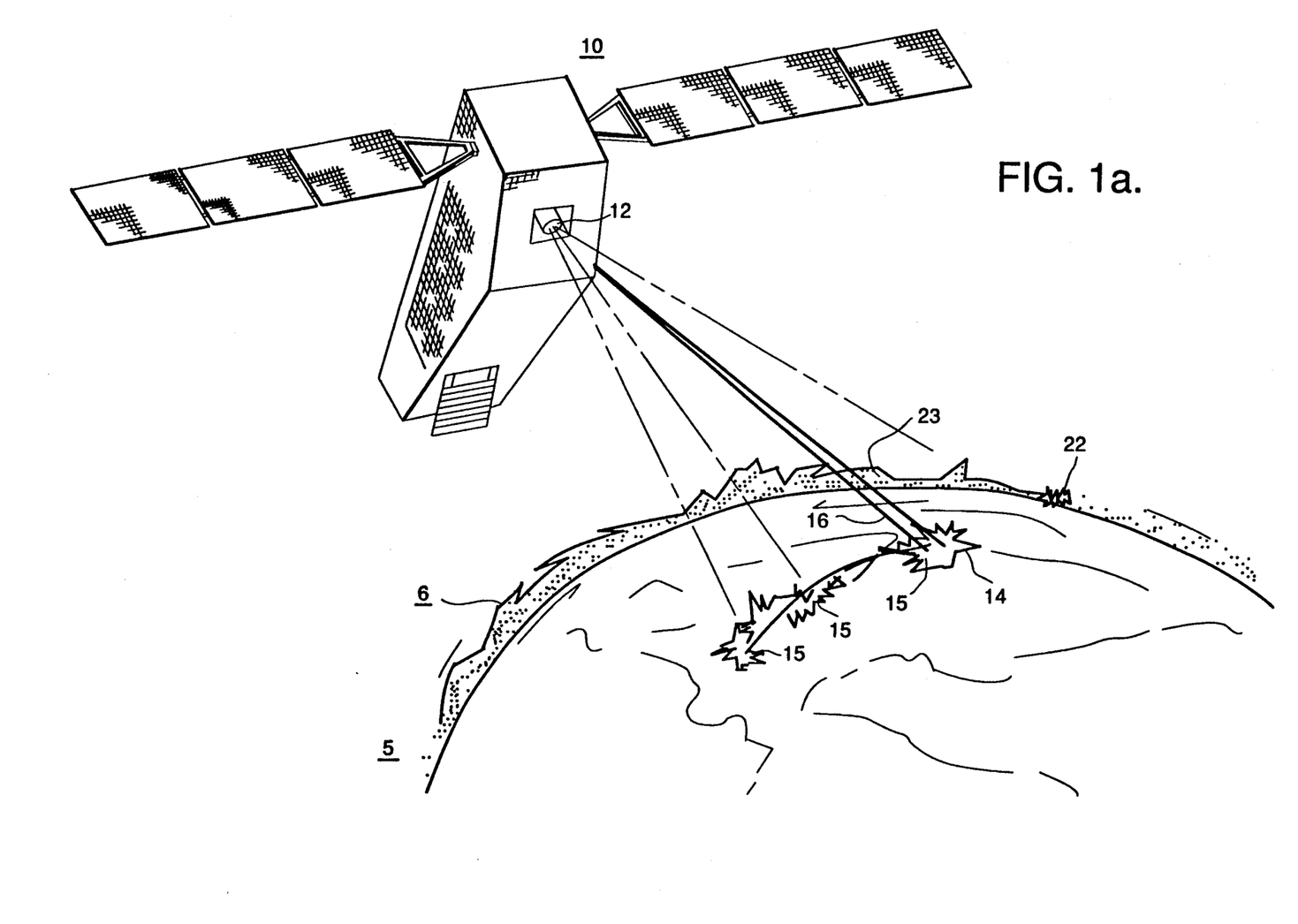
FIG. 1a is a schematic representation of a satellite in space containing the automatic thresholding system in accordance with the present invention.

FIG. 1a is a schematic representation of a satellite in space containing the automatic thresholding system in accordance with the present invention. The satellite 10 circles the earth 5 while scanning sensor system 12 receives radiative energy from potential targets within the earth's atmosphere 6. Target 14 is launched producing radiative energy 15. The target 14, in this example a missile, continues to produce infrared detectable energy 15 as the missile 14 flies toward its target. A body of water, here lake 20, reflects energy 21 which will be detected by the sensor 12 on the satellite 10 as a potential target. The glow layer 23 surrounding the earth 5 produces limb clutter 22, which may be detected by the sensor 12 housed within satellite 10 as yet another potential target.

Figure 1B:
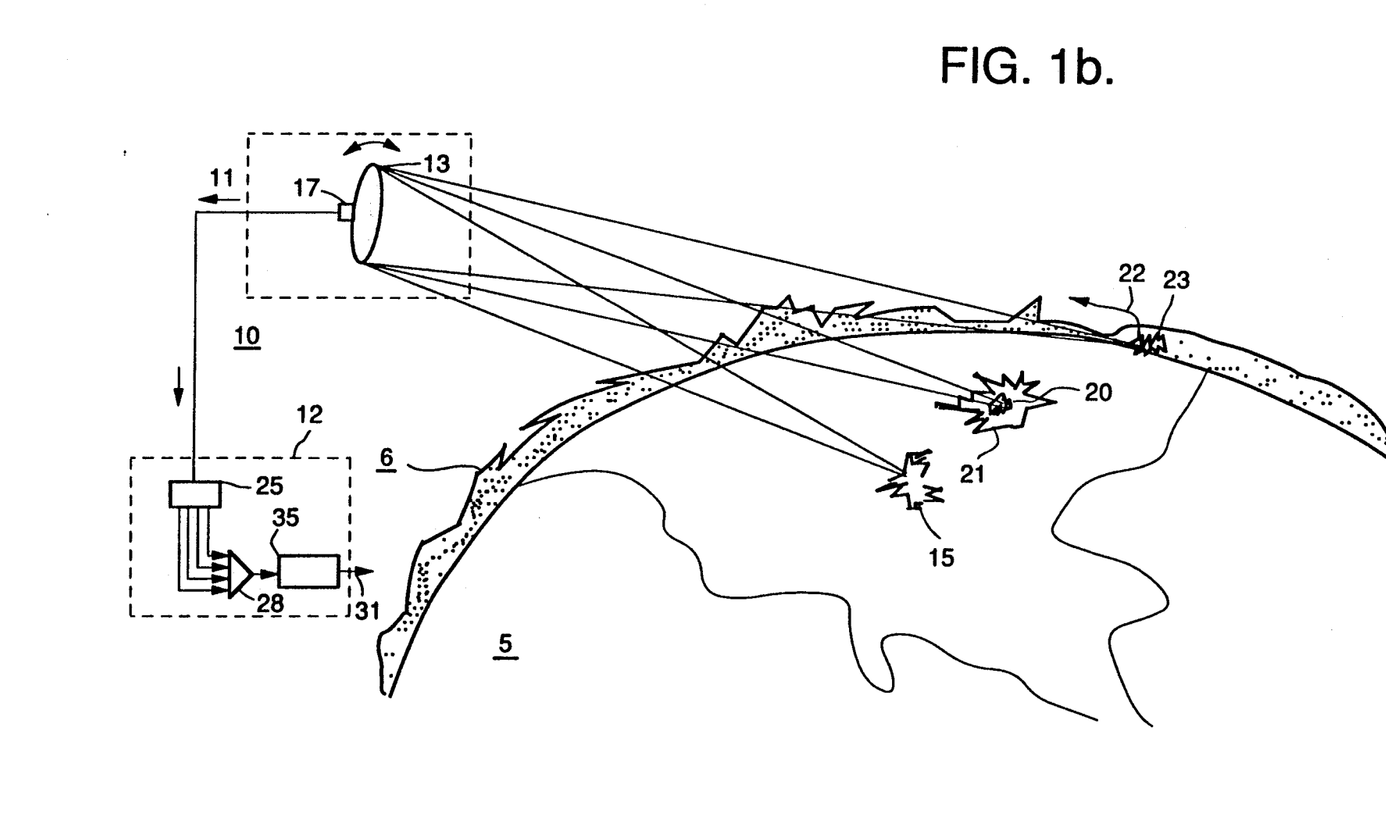
FIG. 1b is a schematic representation of the detection system in the satellite in space in accordance with the present invention.

FIG. 1b is a schematic representation of the scanning sensor system 12 housed in the satellite 10 in accordance with the present invention. An energy gathering device such as a scanning radar array or an optical detector 13 electronically or physically scans the surface of the earth 5. A scanning mechanism 17, either electronic or mechanical, moves the detector 13 face across the surface of the environment scanned. Energy emitted from a multiplicity of sources at a variety of energy intensities is viewed by the detector 13. Potential targets such as missile plume 15, lake 20 and atmosphere 6 emit energy which is detected by the sensor system 12. This received energy is converted into electrical signals by a converter 25. These electrical signals are amplified by amplifier 28 and filtered in filter 35 producing scanning sensor output signal 31.

Figure 2:
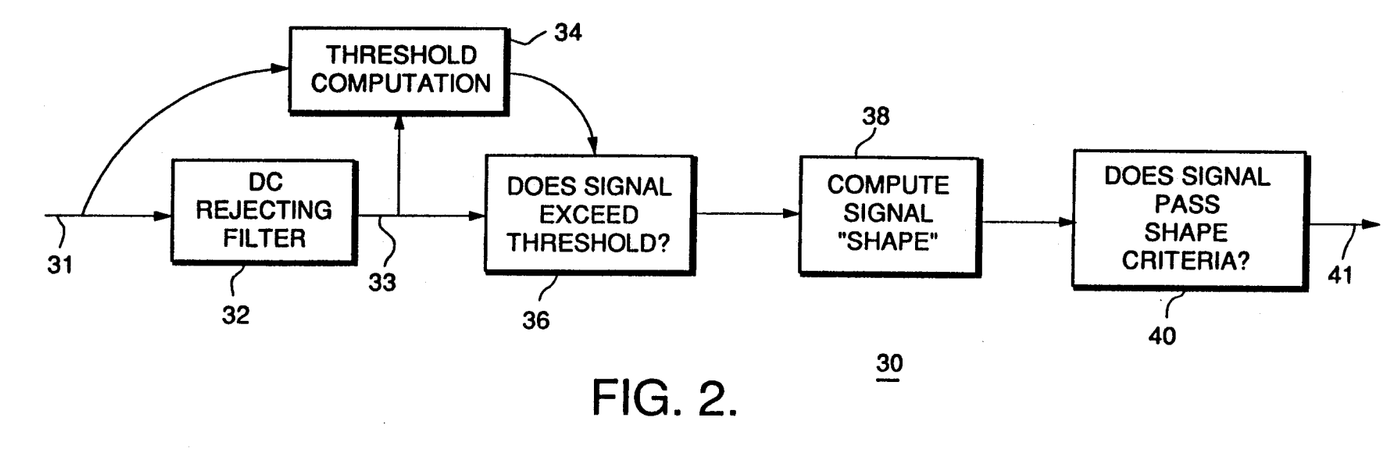
FIG. 2 is a block diagram of the automatic thresholding system in accordance with the present invention.

FIG. 2 is a block diagram of the automatic thresholding system 30 in accordance with the present invention. The shaded portions of FIG. 2 indicate those functions which are performed particular to the present invention. The DC rejecting filter removes the local background level from the signal thereby producing an output signal whose average value is zero. Noise and clutter cause the instantaneous signal to vary around the zero average value in a random manner. Targets, shown as point sources, cause a signal pulse, assumed for our purposes henceforth to be positive in amplitude.

In FIG. 2 the automatic thresholding system 30 receives output signals 31. The purpose of this system 30 is to evaluate and manipulate the signals 33 produced by the DC rejecting filter 32. The DC rejecting filter 32 is commonly used in IR and radar signal processing systems generating electrical signals having both positive and negative amplitudes. Signals 33, and an a-priori knowledge of the expected signals 34 caused by true targets are used to compute a comparison threshold value which will eliminate most non-target signals. For example, those non-target signals caused by noise, background clutter, radiation inducted noise spikes, would not produce a true target detection because they will not have at their peak the amplitude of the designated threshold value.

FIG. 2 is a schematic representation of an IR sensor signal processing chain in accordance with the present invention. Specifically, signal 31 is generated by the scanning sensor from radiative energy detected outside the system 30. This signal 31 enters a DC rejecting filter 32 where it is modulated producing output signal 33. A threshold computation 34 is performed utilizing a priori knowledge of known targets. The automatic threshold determination is compared with the signal amplitude. The threshold and signal amplitude are compared in step 38. If the modulated signal 33 is greater than the automatic threshold then a potential target is detected.

As shown in FIG. 2 the shape of the modulated signal, specifically its width is also a determining factor in target identification. The signal shape is computed in function 38. If the width of the DC rejection filtered signal falls within known parameters 40 then a true target detection 41 occurs.

Figure 3:
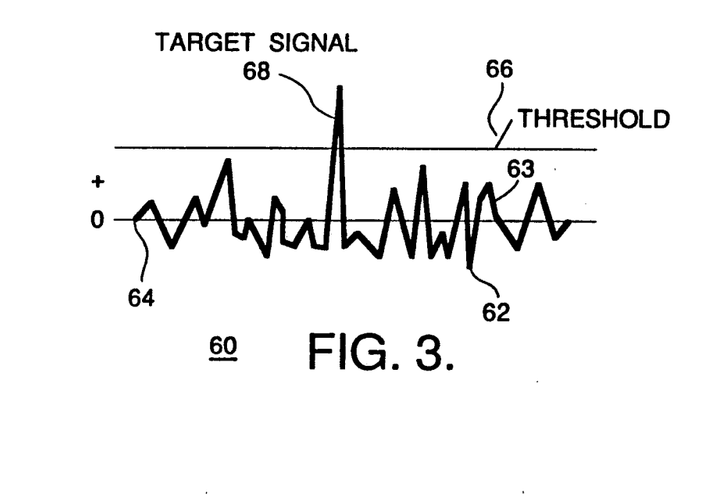
FIG. 3 is a schematic representation of the filter output due to a received target signal plus noise signal compared with a predetermined flat threshold.

FIG. 3 is a schematic representation of the filter output due to a received target signal plus noise signal compared with a predetermined flat threshold. Signal 60 has negative 62 and positive 63 amplitudes which vary about the average value zero, 64. Targets (point sources) here are assumed to generate positive signal pulses 68. When the maximum amplitude signal pulses 68 exceed the threshold 66 a true target is identified.

FIG. 3 illustrates a threshold whose value has been chosen so that no signals due to noise exceed the threshold value, while the signal due to the target does exceed that value. The probability that a signal caused by a true target exceeds threshold is denoted by the symbol Pd (Probability of Detection), and the probability that a signal due to some non-target cause exceeds threshold is denoted by the symbol Pfd (Probability of False Detection). Specifically:

"Detection"=Peak Signal Passes Threshold Detection Criteria

Pd="Probability of Detection"= Probability of Detecting a Target which Actually Exists Pd=No. of Targets Detected/No. of Targets which Exist Pfd="Probability of False Detection"=Probability of Detection when No Targets Actually Exist Pfd=No. of False Detections/No. of Samples Processed.

For example:

$$\frac{5 \text{ False Detections}}{250 \times 500 \text{ Pixels}} = Pfd = 4 \times 10^{-5}.$$

It is one purpose of the automatic thresholding system to compute a suitable value for the threshold to achieve a very low Pfd while still keeping the threshold value low enough so that Pd is very high. It does this by examining the signals going into and coming out of the DC rejecting filter.

When no targets are present the positive and negative excursions of the filter output signal have thoroughly equal amplitudes. This is true whether the signal is due to classical noise sources such as detector thermal noise, or whether it is due to background scene "clutter".

When a target is present, the positive portion of the electrical signal has a significantly greater amplitude than does the negative portion of that same electrical assuming an adequate signal to noise ratio. The system utilizes the ratios of the amplitudes of the positive and negative portions of the filter output signal as a discriminate between targets and noise. Noise and clutter produces a ratio near unity. For legitimate targets this ratio will be larger, 4 or 5 time for a typical filter implementation.

Figure 4A:
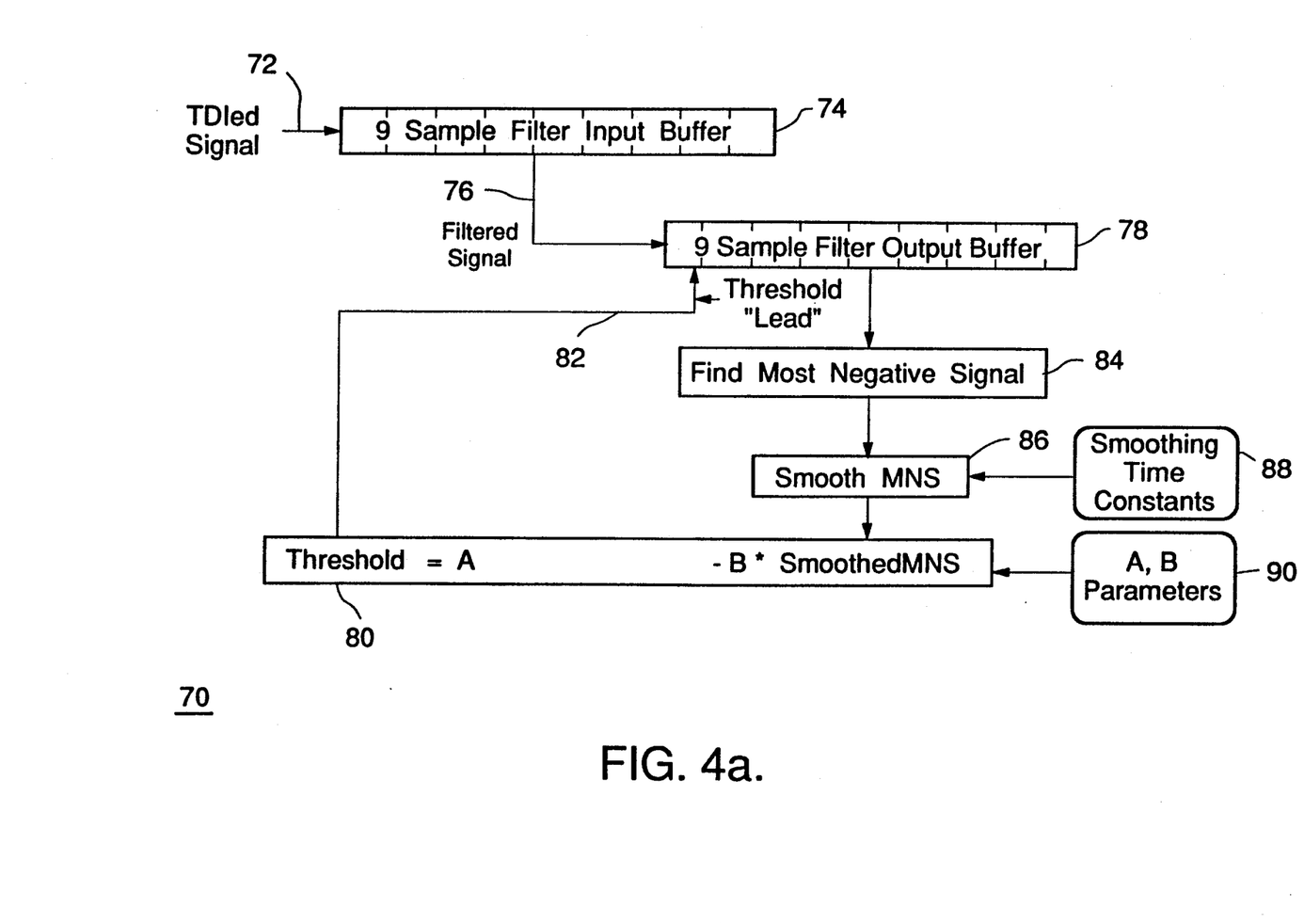
FIG. 4a is a block diagram of a one embodiment of the thresholding system.

FIG. 4a is a block diagram of one embodiment of the automatic thresholding method 70. Signals detected by the sensor 72 are directed to a Filter Input Buffer 74 where they are combined with a set of fixed filter coefficients to produce the Filtered Output Signal 76. The Filter Output Signals are stored in a Filter Output Buffer 78 so that they may be examined to determine the proper threshold value.

The Sample Filter Output Buffer 78, provides electrical signals to the step 84 "Finds the Most Negative Signal", by examining the filter output signals stored in the buffer 78 and selecting that single signal which has the most negative amplitude. If there are no negative signals in the buffer, the value for Most Negative Signal is set to zero. At each sample time a new signal sample enters the Filter Input Buffer 74 and a new filter output signal 76 is generated and sent to the Filter Output Buffer 78. At each sample time a new value of Most Negative Signal (MNS) is found.

The Smoothing Function 86, "Smooth MNS", shown in FIG. 4a filters the successive MNS values to reduce sample to sample variability. This smoothing technique is controlled by "Smoothing Time Constants" 88. At each sample time, the automatic threshold method 80 computes a new threshold value based upon the current value of Smoothed Most Negative Signal provided by function 86. The equation used to compute the threshold value is:

$$\text{Threshold} = A - B * \text{Smoothed Most Negative Signal}$$

as shown in function 80. The parameters A and B are fixed numbers chosen to achieve the desired false detection rate. The threshold value computed by method 80 is compared to one of the signals contained in the Filter Output Buffer 78 in order to determine whether that signal exceeds the threshold value and is thereby "detected" 82. The signal in the Filter Output Buffer 78 which is compared to the computed threshold value is that signal which occurred at the earliest time. Thus, the threshold computed at sample time N is compared to the signal generated at earlier sample time M where the difference between M and N is one half the length of the Filter Output Buffer 78. This difference in time is the "Threshold Lead" 82.

Figure 4B:
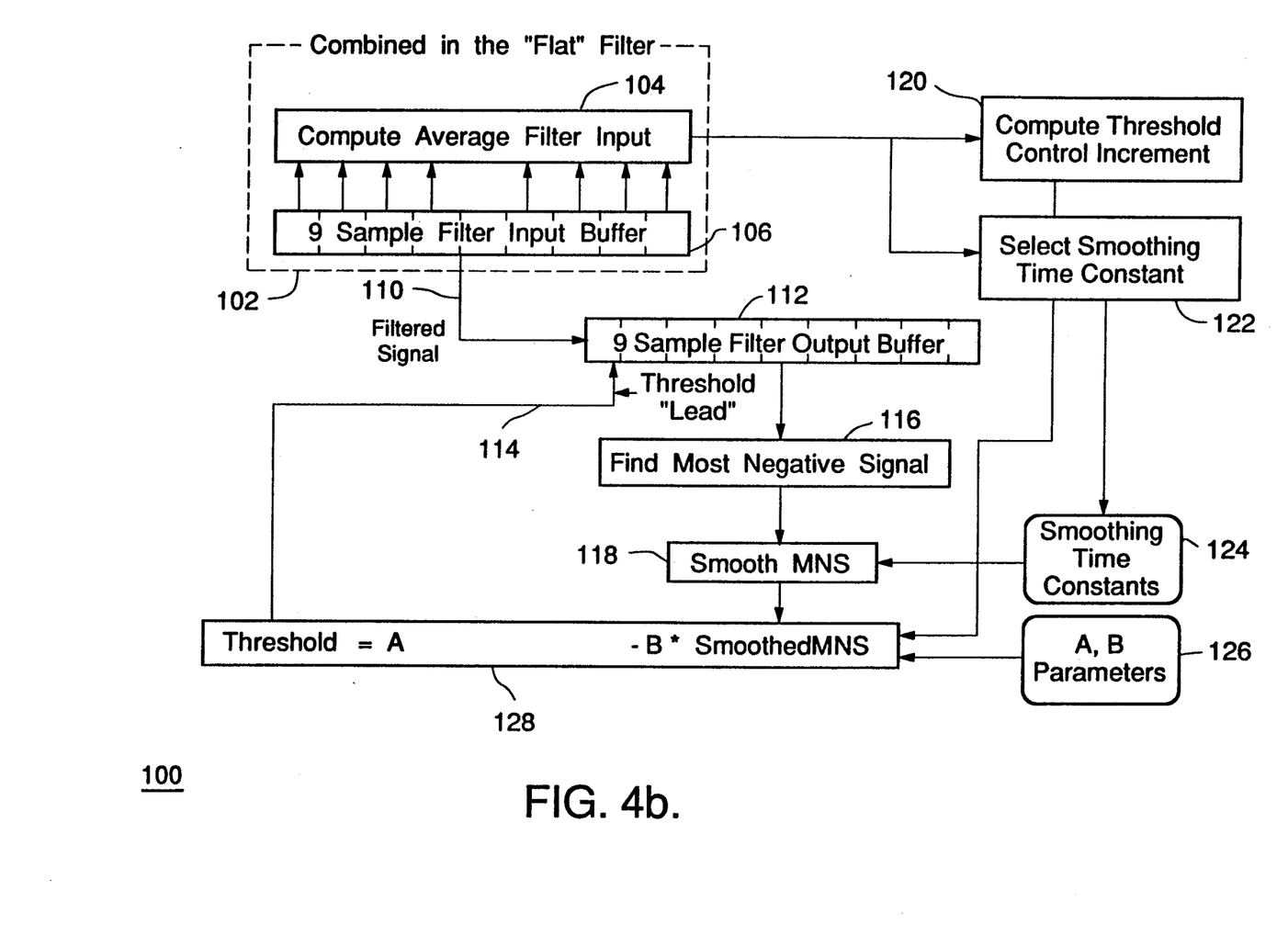
FIG. 4b is a block diagram of an alternative embodiment of the automatic thresholding system in accordance with the present invention.

FIG. 4b is a block diagram of an alternate embodiment of the automatic thresholding system in accordance with the present invention. This embodiment is similar to that described in FIG. 4a with the addition of functions to automatically select values for the Smoothing Time Constants 122 and for the computation of a Threshold Control Increment 120 which is added to the threshold computed as described in FIG. 4a. An added step 104 examines the signals contained in the Filter Input Buffer 106 and computes the average value of these signals.

Large values of Average Filter Input indicate "bright" areas of the observed scene. At each sample time the current value of Average Filter Input 130 is supplied to steps 120 and 122. Step 120 computes a Threshold Control Increment which is added to the threshold value computed in function 128. Function 122 compares the current value of Average Filter Input 130 to a precomputed threshold value, the "Dim/Bright Threshold", and selects a single value of Smoothing Time Constant 124 for use in the current threshold computation. For large values of Average Filter Input 130, the selected smoothing time constant is short so that the threshold can responds rapidly to changes in bright scenes. For small values of Average Filter Input 130 the selected smoothing time constant is long so that the threshold changes slowly in "dim" scene areas.

Because the negative portions of the signal are little affected by the presence or absence of a target, the system bases its threshold value only on the negative portions of the filter output. This is done by sending the filter output to a "Filter Output Buffer" where the last N samples of filter output are stored.

In the case simulated the value of N=9, but other values are acceptable. The first step in threshold computation is to find the "Most Negative Signal" in this filter output Buffer. The Most Negative Signal (MNS) is defined to be that signal with the most negative amplitude. If there is no negative signal in the buffer, then MNS=0. At each sample time, the buffer is searched to find the current MNS.

The MNS can change from sample to sample. The second step in threshold computation is to smooth these varying values of MNS so that the variation from sample to sample is reduced. In the case simulated, this smoothing is performed by a recursive filter, but other techniques can be used.

The third and last step in threshold computation is to accurately compute the threshold value. In the case simulated:

Threshold = $A - B*MNS$ where A and B are constants chosen to achieve the desired Pfd.

In the more general case any function of MNS could be used to compute the threshold. For example, a non-linear term could be included to raise thresholds when the absolute value of MNS is large:

Threshold = $A - B*MNS + C*MNS^2$.

Table I contains a representative comparison of the type of signals detected by the system of the present invention and the approximate ratio of the Most positive amplitude of the detected, filtered signal and the most negative.

TABLE I

| Type of Signal | Approximate Ratio of Most Positive and Most Negative Signals |
|---|---|
| Targets | 4:1 |
| Gaussian Noise | 1:1 |
| Non-Gaussian Noise | 1:1 |
| Cloud Edges | 1:1 |

In summary, features of the method described above include: the threshold value is based on the negative portions of the signal remaining after filtering to remove the local DC level; a signal "shape test" is combined with the amplitude test to provide additional discrimination between targets and noise, and the local average signal amplitude is used to identify areas of potential clutter and to increase noise rejection in those areas.

In FIG. 4b the overall structure of the threshold computation portion of the Automatic Thresholding System is shown. The smoothing time constant for smoothing of MNS is selected. If the scene is "dim", then the average filter input is less than some pre-computed value (the Dim/Bright Threshold), then a long smoothing time constant is selected and the computed threshold values change slowly with time. If the scene is "bright, the average filter input is greater than the Dim/Bright Threshold, then a short time constant is selected for smoothing and the threshold values are allowed to change more rapidly. Next, after the scene is deemed to be dim or bright, a computation is performed producing a "Threshold Control Increment" which is added to the threshold in bright scene areas to raise thresholds slightly in those area which are likely to contain clutter.

Figure 5A:
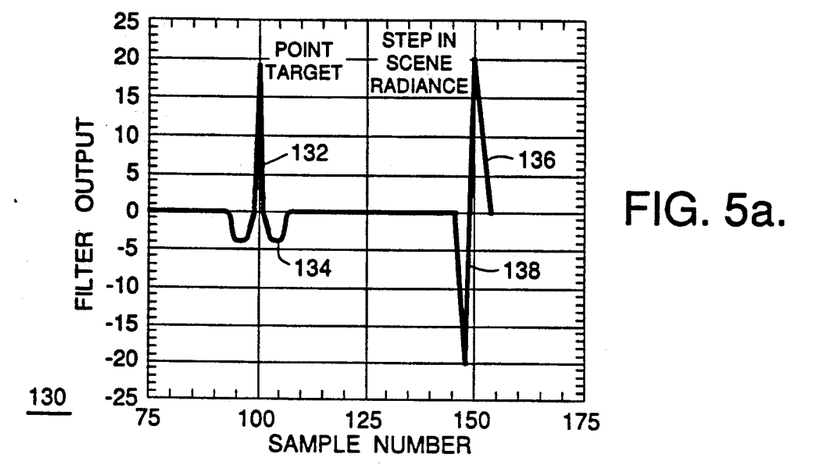
FIG. 5a is a graph comparing filter output to sample number for a point target and for a step in background signal representing clutter.

FIG. 5a is a graph 130 comparing filter output to sample number for a point target and a step in scene radiance representing clutter. The point target signal spike positive component 132 has here a value of approximately 18 volts. While the negative component 134 of the same spike has a vlaue of approximately −4 volts. The Step in Scene radiance oscillates negative spike 138 to positive spike 136 in the range of −20 volts to 20 volts, respectively. Step in Scene radiance means that the area surrounding the potential target becomes very bright in comparison to other areas of less light.

Figure 5B:
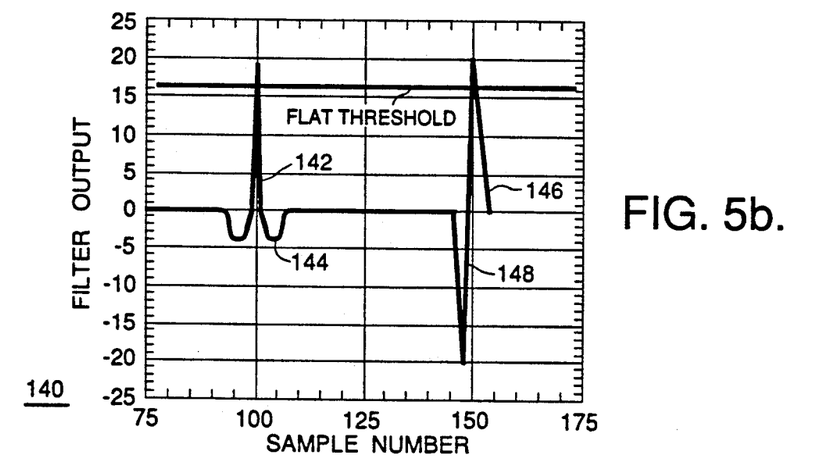
FIG. 5b is a graph comparing filter output to sample number for a point target and step clutter compared with a fixed, flat threshold.

FIG. 5b is a graph 140 comparing filter output to sample number for a point target compared with a fixed, flat threshold. The point target signal spike positive component 142 has here a value of approximately 18 volts. The Step in Scene radiance positive spike 146 has a value of 20 volts. The flat threshold 150 is non-variable and here is shown at 17 volts. For this example, both target signal and clutter signal exceed threshold and are "detected".

Figure 5C:
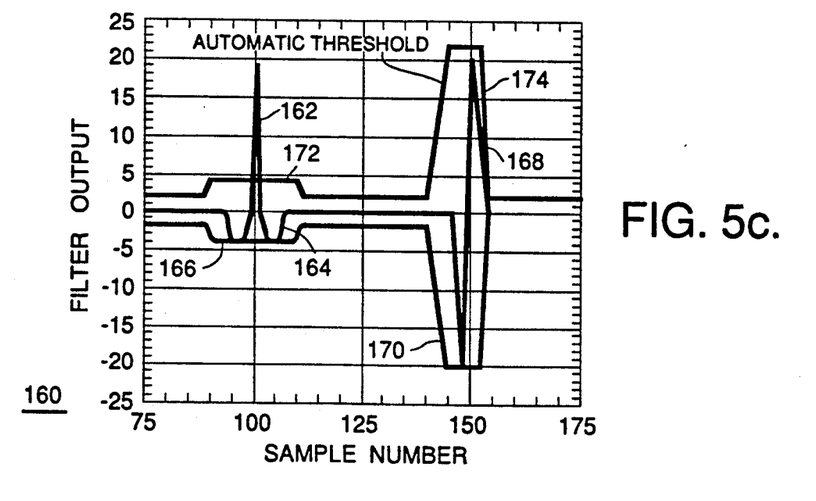
FIG. 5c is a graph comparing filter output to sample number for a point target and step clutter compared with an automatic, variable threshold in accordance with the present invention.

FIG. 5c is a graph comparing filter output to sample number for a point target compared with an automatic, variable threshold in accordance with the present invention. The point target signal spike positive component 162 has here a value of approximately 18 volts. While the negative component 164 of the same spike has a value of approximately −4 volts. The Step in Scene radiance oscillates negative spike 170 to positive spike 174 in the range of −20 volts to 20 volts, respectively. The variable threshold 172 for the point target computed in accordance with hits invention has a value of approximately 4 volts. Because the peak target signal 162 value (18 volts) exceeds the threshold value (4 volts), the point target is detected. The variable threshold 174 for the step in scene radiance computed in accordance with this invention has value of approximately 22 volts. Because the peak clutter signal 168 value (20 volts) is less than the threshold value (22 volts), the step in scene radiance is not detected.

Figure 6:
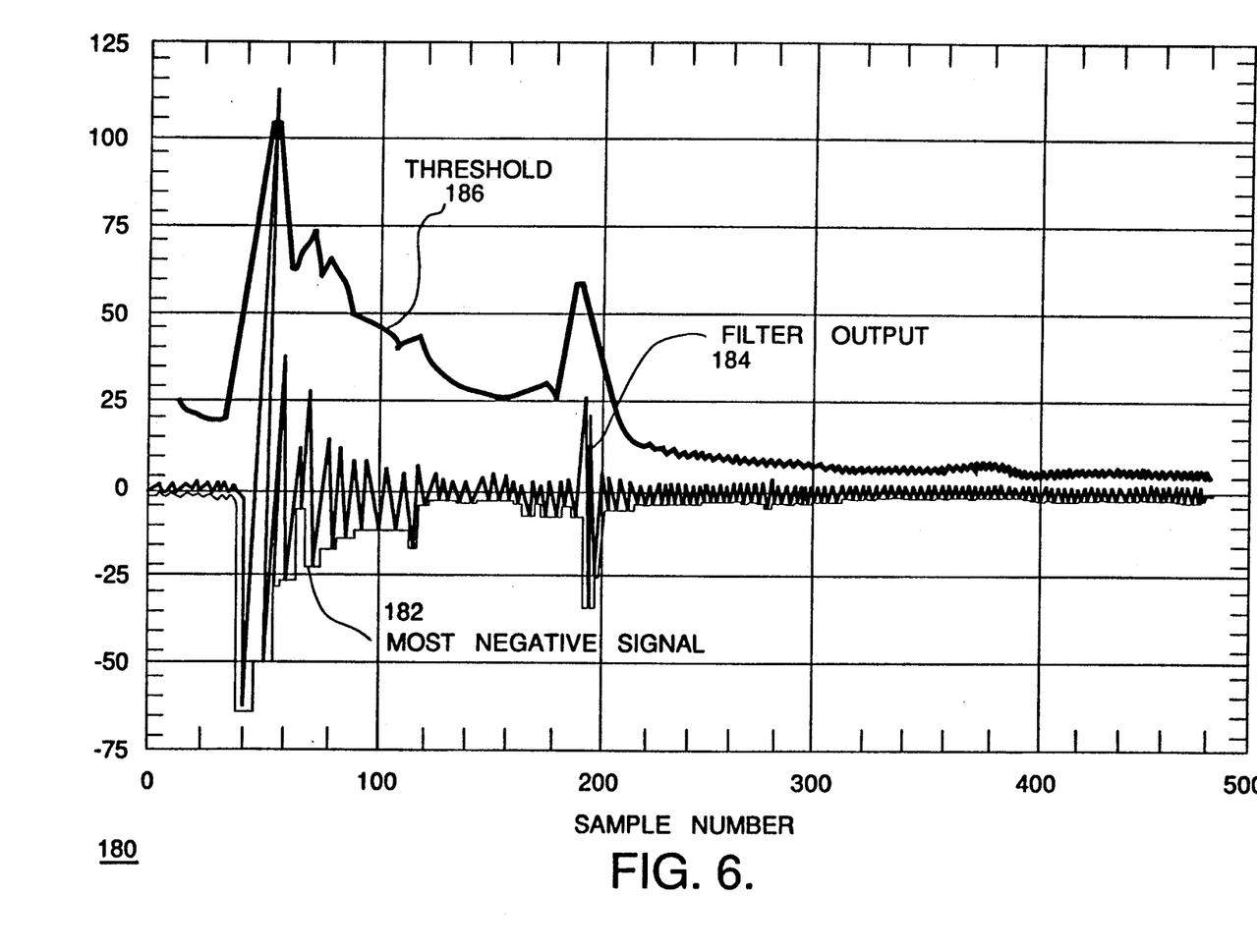
FIG. 6 is a graph comparing filter output to sample number for an automatic, variable threshold system responding to rapidly changing clutter conditions.

FIG. 6 is a graph 180 comparing filter output to sample number for an automatic, variable threshold system responding to rapidly changing clutter conditions. Because of changing scene radiance, the filter output signal 184 varies rapidly. The Most Negative Signal 182 is used in the automatic threshold computation. The automatic, variable threshold 186 computed in accordance with the present invention rises and falls rapidly in response to the changing clutter conditions.

Figure 7:
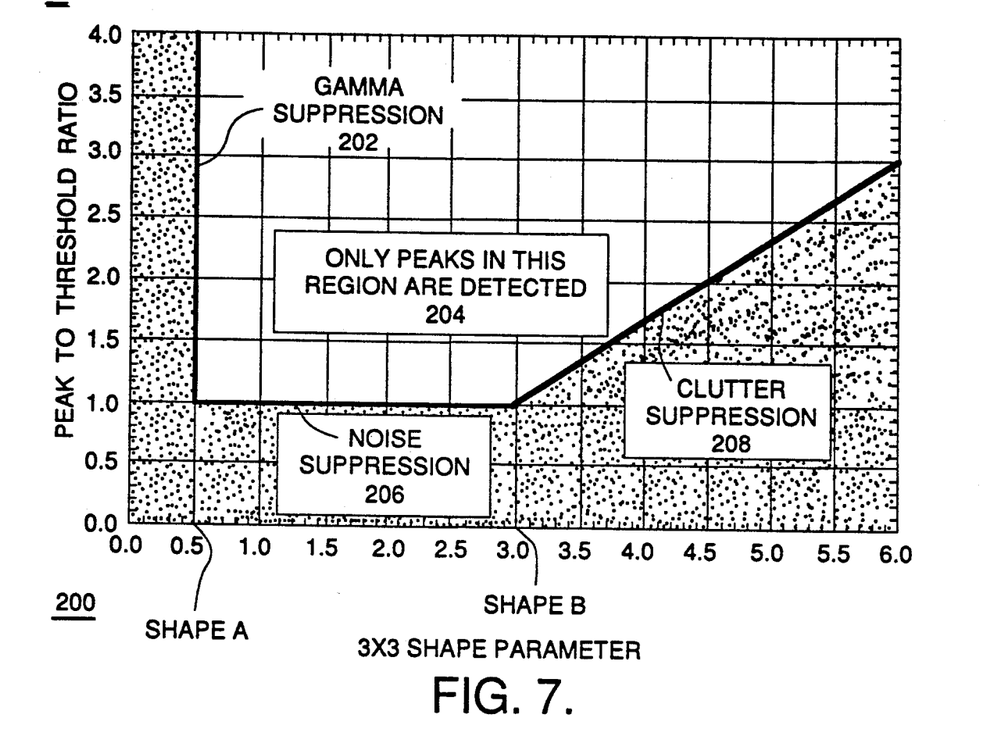
FIG. 7 is a graph of peak signal to threshold ratio versus 3×3 "shape" parameter for the combined threshold and shape test showing the region where potential targets are detected.

FIG. 7 is a graph 200 of peak to threshold ratio versus "shape" parameter for the combined threshold and shape test. The second portion of the Automatic Thresholding System includes a "shape" test to further reduce Pfd. This shape test is based on some general characteristics of signals produced by targets, radiation induced noise spikes, and clutter. Targets typically produce signals which span a finite time interval and thereby produce a few positive amplitude signal samples. Radiation induced noise spikes, on the other hand, produce very short duration pulses (spikes) which typically produce only a single positive sample. Clutter typically produces signals which are extended in time and produce several positive samples. Peaks only in region 204 of graph 200 are detected. The combined threshold and shape test bound region 204 with gamma suppression 202, noise suppression 206 and clutter suppression 208.

The "3×3" designation shown on FIG. 7 is representative of one shape determination configuration and is not intended to be the only method of shape comparison. A "5×5" array of pixels or "9×9" array would also produce the same results.

Figure 8:
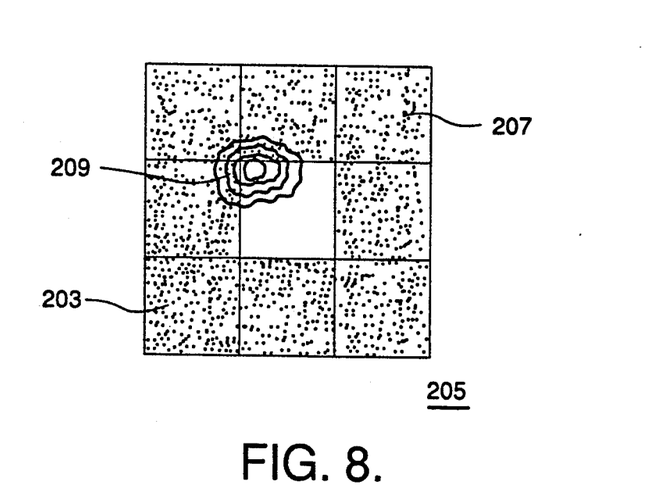
FIG. 8 is a schematic representation of one example of a detection scheme for the invention a 3×3 pixel array.

FIG. 8 is a schematic representation of a 3×3 pixel array 205. This array contains nine pixels 207. There are many different parameters which could be used to characterize signal shape. The one developed for the case simulated is called the "3×3 Shape Parameter". When a positive peak signal is found whose amplitude exceeds the computed threshold value, then a 3×3 packet of signal samples surrounding that peak sample 209 is captured and used to compute the 3×3 shape parameter. This parameter is the sum of the amplitudes of the eight nearest neighbor samples, shown as region 203 divided by the amplitude of the peak sample.

Larger values therefore indicate broader signal shape. If this shape parameter value is less than some pre-computed value (Shape A) shown as numerical values 0.0 to 0.5) then the peak signal is rejected as a likely noise spike. If the shape parameter has an intermediate value (in the range of 0.50 through 3.0) then the signal is retained as a likely target. If the shape parameter has a large value (greater than some pre-computed value Shape B, here greater than 3.0), then the peak is considered to be likely clutter and the effective threshold value is raised so that broad peaks are accepted only if they have large amplitudes. The combined amplitude and shape test is illustrated in FIG. 7. In FIG. 7. only signals whose parameters fall within the unshaded portion of the figure are accepted as possible targets. All signals which fall in the shaded area are rejected.

Figure 9:
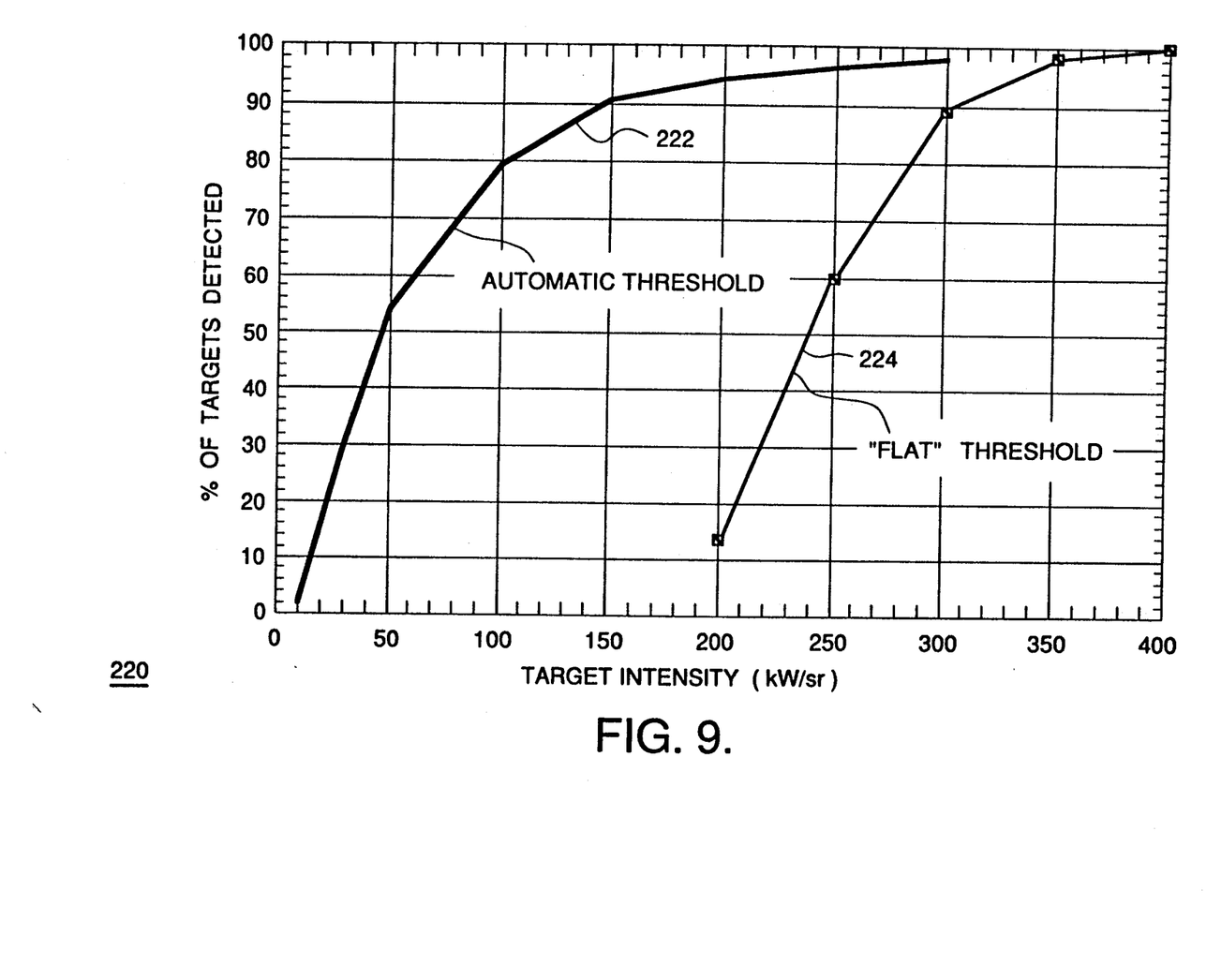
FIG. 9 is a graph comparing percent of targets detected versus target intensity for both "automatic threshold" and "flat" threshold systems.

FIG. 9 is a graph 220 comparing percent of targets detected versus target intensity for both "automatic threshold" and "flat" threshold systems. FIG. 6 compares the performance of the automatic thresholding system against that of a "flat" thresholding algorithm which represents the performance of thresholding algorithms prior to the present invention. The two curves, automatic threshold 222 and flat threshold 224 show that at the same values of Pfd the system yields a significantly higher probability of detecting low intensity targets than is possible with the "flat threshold".

In FIG. 9 the "flat" thresholding algorithm used here is one which establishes the same threshold value over the entire image area, with the value of that threshold chosen to yield the same Pfd as is achieved with the present system. FIG. 7 shows that the ability of the systems threshold to change over the scene, depending upon clutter amplitudes, permits targets to be detected in the relatively "quiet" areas of the scene while still containing the number of false detections in the "noisy" areas of the scene.

Figure 10:
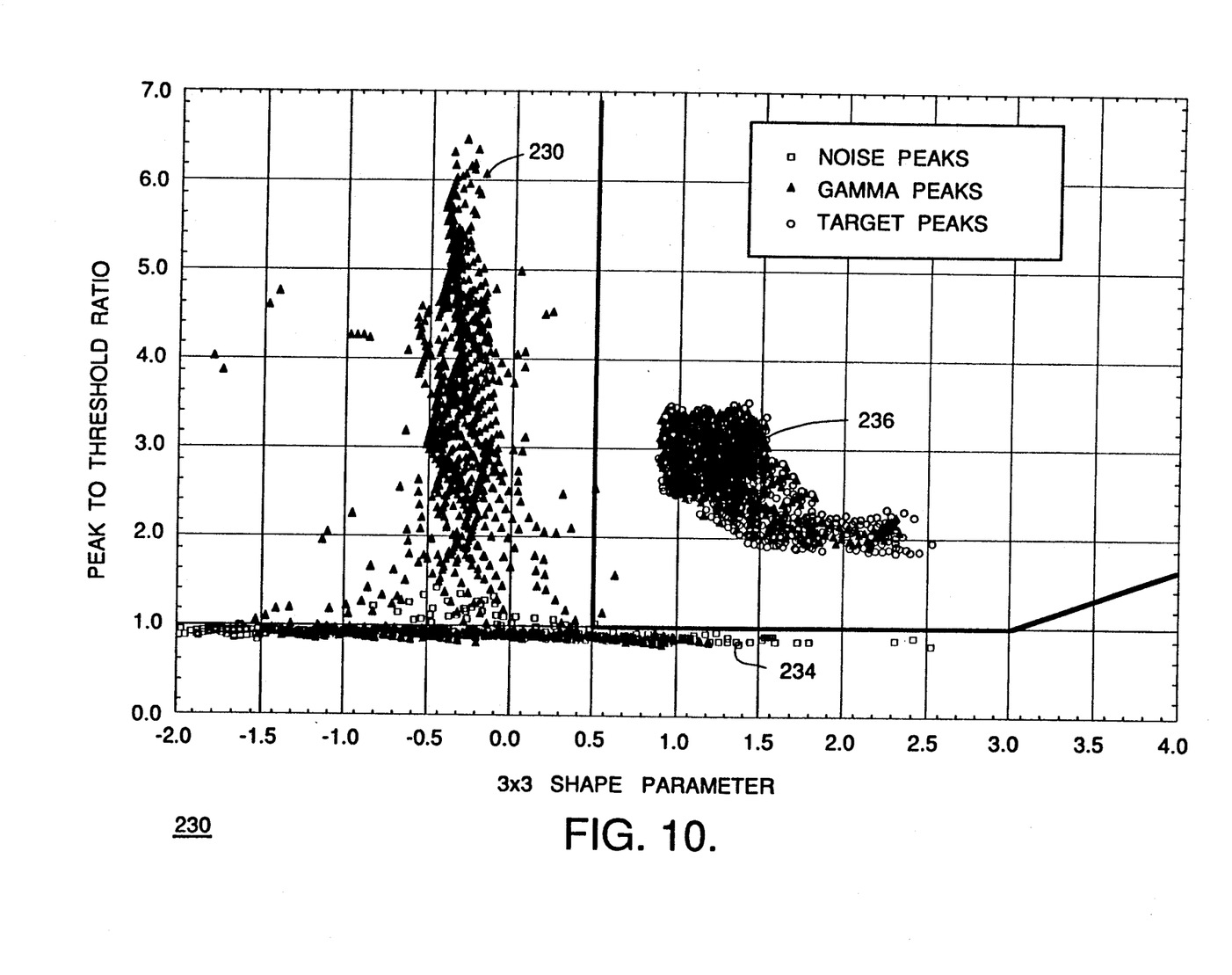
FIG. 10 is a graph comparing peak signal to threshold ratio versus 3×3 shape parameter providing discrimination between targets, gamma spikes and noise in accordance with the present invention.

FIG. 10 is a graph 230 comparing peak to threshold ratio versus 3×3 shape parameter providing discrimination between targets peaks 236, gamma peaks 232 and noise peaks 234 in accordance with the present invention. FIG. 10 shows the effectiveness of the combined threshold and shape tests in discriminating between targets and noise and gamma radiation induced spikes.

The invention used in conjunction with scanning infrared sensors detects small but bright (point source) targets embedded in a cluttered background. The invention is also applicable with radar systems. This system facilitates operation at very high probability of target detection and very low probability of false detection in a cluttered background.

Background scene clutter typically produces signals which span several samples. It is therefore possible to discriminate between these types of signals based on a "shape" test which characterizes the size, extent or duration of the positive portion of the signal. A narrow shape will indicate a potential spike, a moderate shape will indicated a potential target, while a broad shape will indicate likely clutter.

The combined amplitude and shape tests which have been described form a complete automatic thresholding system. It is possible to achieve better performance by inclusion of a third feature which automatically allows the algorithm to change its operating conditions depending upon whether the area currently being scanned is likely to contain clutter or not.

Thus, several embodiments of the present invention and variations thereof have been disclosed. From the foregoing, it is clear that the present invention is applicable to sensor, space based detection systems for a wide variety of targets and is not limited to infrared sensors. Accordingly, the present invention is limited only by the scope of the following claims.

What is claimed is:

1. An automatic signal thresholding system for target detection, comprising:
   a detector operable to detect energy from outside of said automatic signal thresholding system, said detector further operable to generate at least one output electrical signal representative of said detected energy;
   a filter operable to receive said output electrical signals and produce at least one filtered output electrical signal having both positive and negative amplitudes values;

a target signal threshold generator operable to determine the most negative amplitudes of said filtered output electrical signals, smooth the values of said most negative amplitudes and further operable to generate a target signal threshold using known predetermined probability constants representative of target signals multiplied by said smoothed most negative amplitudes of said filtered electrical output signals;

a target signal threshold comparator operable to compare said filtered electrical output signals and said generated target signal threshold;

a target signal shape generator operable to approximate the shape of a target signal, where said electrical output signals exceed said generated signal threshold; and a target signal shape comparator operable to compare said shape of said filtered output signals with predetermined, known target signal shapes.

2. The automatic signal thresholding system as in claim 1 wherein said detector is an electronic scanning radar array.

3. The automatic signal thresholding system as in claim 1 wherein said detector is an infrared detector.

4. The automatic signal thresholding system as in claim 1 wherein said filter is a DC rejecting filter.

5. The automatic signal thresholding system as in claim 1 wherein said known predetermined probability constants are representative of the probability of detection when no targets exist.

6. The automatic signal thresholding system as in claim 1 wherein said target signal shape generator further approximates said shape of said target signal by summing the amplitudes of the potential target signals divided by the greatest amplitude.

7. A method of automatic signal thresholding for target detection, said method comprising the steps of:

detecting energy from outside of said automatic signal thresholding system and generating at least one output electrical signal representative of said detected energy;

filtering said output electrical signals and producing at least one filtered output electrical signal having both positive and negative amplitudes values;

generating a target signal threshold determining the most negative amplitudes of said filtered output electrical signals, smoothing the values of said most negative amplitudes and further generating a target signal threshold using known predetermined probability constants representative of target signals multiplied by said smoothed most negative amplitudes of said filtered electrical output signals;

comparing said target signal threshold to said filtered electrical output signals;

generating a target signal shape approximating the shape of a target signal, where said electrical output signals exceed said generated signal threshold; and comparing a target signal shape to compare said shape of said filtered output signals with predetermined, known target signal shapes.

8. A method of providing an automatic signal thresholding system for target detection, said method comprising the steps of:

providing a detector operable to detect energy from outside of said automatic signal thresholding system, said detector further operable to generate at least one output electrical signal representative of said detected energy;

providing a filter operable to receive said output electrical signals and produce at least one filtered output electrical signal having both positive and negative amplitudes values;

providing a target signal threshold generator operable to determine the most negative amplitudes of said filtered output electrical signals, smooth the values of said most negative amplitudes and further operable to generate a target signal threshold using known predetermined probability constants representative of target signals multiplied by said smoothed most negative amplitudes of said filtered electrical output signals;

providing a target signal threshold comparator operable to compare said filtered electrical output signals and said generated target signal threshold;

providing a target signal shape generator operable to approximate the shape of a target signal, where said electrical output signals exceed said generated signal threshold; and providing a target signal shape comparator operable to compare said shape of said filtered output signals with predetermined, known target signal shapes.

9. A clutter dependent automatic signal thresholding system for target detection, comprising:

a detector operable to detect energy from outside of said automatic signal thresholding system, said detector further operable to generate at least one output electrical signal representative of said detected energy;

a filter operable to receive said output electrical signals and produce at least one filtered output electrical signal having both positive and negative amplitudes values;

a target signal threshold generator operable to determine the most negative amplitudes of said filtered output electrical signals, smooth the values of said most negative amplitudes and further operable to generate a target signal threshold using known predetermined probability constants representative of target signals multiplied by said smoothed most negative amplitudes of said filtered electrical output signals;

a target signal threshold comparator operable to compare said filtered electrical output signals and said generated target signal threshold;

a target signal shape generator operable to approximate the shape of a target signal where said electrical output signals exceed said generated signal threshold;

a target signal shape comparator operable to compare said shape of said filtered output signals with predetermined, known target signal shapes; and a target signal threshold increment generator operable to determine the local average of said output electrical signals, further operable to select a precomputed dim/bright threshold smoothing value and a target signal threshold increment.

10. The clutter dependent automatic signal thresholding system as in claim 9 wherein said detector is an electronic scanning radar array.

11. The clutter dependent automatic signal thresholding system as in claim 9 wherein said detector is an infrared detector.

12. The clutter dependent automatic signal thresholding system as in claim 9 wherein said filter is a DC rejecting filter.

13. The clutter dependent automatic signal thresholding system as in claim 9 wherein said known predetermined probability constants are representative of the probability of detection when no targets exist.

14. The clutter dependent automatic signal thresholding system as in claim 9 wherein said target signal shape generator further approximates said shape of said target signal by summing the amplitudes of the potential target signals divided by the greatest amplitude.

15. A method of providing A clutter dependent automatic signal thresholding system for target detection, said method comprising the steps of:
providing a detector operable to detect energy from outside of said automatic signal thresholding system, said detector further operable to generate at least one output electrical signal representative of said detected energy;
providing a filter operable to receive said output electrical signals and produce at least one filtered output electrical signal having both positive and negative amplitudes values;
providing a target signal threshold generator operable to determine the most negative amplitudes of said filtered output electrical signals, smooth the values of said most negative amplitudes and further operable to generate a target signal threshold using known predetermined probability constants representative of target signals multiplied by said smoothed most negative amplitudes of said filtered electrical output signals;
providing a target signal threshold comparator operable to compare said filtered electrical output signals and said generated target signal threshold;
providing a target signal shape generator operable to approximate the shape of a target signal, where said electrical output signals exceed said generated signal threshold;
providing a target signal shape comparator operable to compare said shape of said filtered outputs with predetermined, known target signal shapes; and
providing a target signal threshold increment generator operable to determine the local average of said output electrical signals, further operable to select a precomputed dim/bright threshold smoothing value and a target signal threshold increment.

16. A method of clutter dependent automatic signal thresholding system for target detection, said method comprising the steps of:
detecting energy from outside of said automatic signal thresholding system and generating at least one output electrical signal representative of said detected energy;
filtering said output electrical signals and producing at least one filtered output electrical signal having both positive and negative amplitudes values;
determining the most negative amplitudes of said filtered output electrical signals, smoothing the values of said most negative amplitudes and further generating a target signal threshold using known predetermined probability constants representative of target signals multiplied by said smoothed most negative amplitudes of said filtered electrical output signals;
comparing said target signal theshold to said filtered electrical output signals;
generating a target signal shape approximating the shape of a target signal, where said electrical output signals exceed said generated signal threshold;
comparing a target signal shape to compare said shape of said filtered output signals with predetermined, known target signal shapes; and
generating a target signal threshold increment determining the local average of said output electrical signals, further operable to select a precomputed dim/bright threshold smoothing value and a target signal threshold increment.

17. An automatic signal thresholding system for target detection, comprising:
an electronic scanning radar array operable to detect energy from outside of said automatic signal thresholding system, said radar array further operable to generate at least one output electrical signal representative of said detected energy;
a DC rejecting filter operable to receive said output electrical signals and produce at least one filtered output electrical signal having both positive and negative amplitudes values;
a target signal threshold generator operable to determine the most negative amplitudes of said filtered output electrical signals, smooth the values of said most negative amplitudes and further operable to generate a target signal threshold using known predetermined probability constants representative of when targets do not exist multiplied by said smoothed most negative amplitudes of said filtered electrical output signals;
a target signal threshold comparator operable to compare said filtered electrical output signals and said generated target signal threshold;
a target signal shape generator operable to approximate the shape of a target signal, where said electrical output signals exceed said generated signal threshold; and
a target signal shape comparator operable to compare said shape of said filtered output signals with predetermined, known target signal shapes.

18. An automatic signal thresholding system for target detection, comprising:
an infrared optical detector operable to detect infrared energy from outside of said automatic signal thresholding system, said infrared optical detector further operable to generate at least one output electrical signal representative of said detected energy;
a DC rejecting filter operable to receive said output electrical signals and produce at least one filtered output electrical signal having both positive and negative amplitudes values;
a target signal threshold generator operable to, determine the most negative amplitudes of said filtered output electrical signals, smooth the values of said most negative amplitudes and further operable to generate a target signal threshold using known predetermined probability constants representative of when targets do not exist multiplied by said smoothed most negative amplitudes of said filtered electrical output signals;
a target signal threshold comparator operable to compare said filtered electrical output signals and said generated target signal threshold;
a target signal shape generator operable to approximate the shape of a target signal, where said electrical output signals exceed said generated signal threshold; and a target signal shape comparator operable to compare said shape of said filtered output signals with predetermined, known target signal shapes.

19. A clutter dependent automatic signal thresholding system for target detection, comprising:

an electronic scanning radar array operable to detect energy from outside of said automatic signal thresholding system, said radar array further operable to generate at least one output electrical signal representative of said detected energy;

a DC rejecting filter operable to receive said output electrical signals and produce at least one filtered output electrical signal having both positive and negative amplitudes values;

a target signal threshold generator operable to, determine the most negative amplitudes of said filtered output electrical signals smooth the values of said most negative amplitudes and further operable to generate a target signal threshold using known predetermined probability constants representative of when targets do not exist multiplied by said smoothed most negative amplitudes of said filtered electrical output signals;

a target signal threshold comparator operable to compare said filtered electrical output signals and said generated target signal threshold;

a target signal shape generator operable to approximate the shape of a target signal, where said electrical output signals exceed said generated signal threshold;

a target signal shape comparator operable to compare said shape of said filtered output signals with predetermined, known target signal shapes; and a target signal threshold increment generator operable to determine the local average of said output electrical signals, further operable to select a pre-computed dim/bright threshold smoothing value and a target signal threshold increment.

20. A clutter dependent automatic signal thresholding system for target detection, comprising:

an infrared optical detector operable to detect infrared energy from outside of said automatic signal thresholding system, said infrared optical detector further operable to generate at least one output electrical signal representative of said detected energy;

a DC rejecting filter operable to receive said output electrical signals and produce at least one filtered output electrical signal having both positive and negative amplitudes values;

a target signal threshold generator operable to determine the most negative amplitudes of said filtered output electrical signals, smooth the values of said most negative amplitudes and further operable to generate a target signal threshold using known predetermined probability constants representative of when targets do not exist multiplied by said smoothed most negative amplitudes of said filtered electrical output signals;

a target signal threshold comparator operable to compare said filtered electrical output signals and said generated target signal threshold;

a target signal shape generator operable to approximate the shape of a target signal, where said electrical output signals exceed said generated signal threshold;

a target signal shape comparator operable to compare said shape of said filtered output signals with predetermined, known target signal shapes; and a target signal threshold increment generator operable to determine the local average of said output electrical signals, further operable to select a pre-computed dim/bright threshold smoothing value and a target signal threshold increment.

21. A method of automatic target detection, said method comprising the steps of:

(A) receiving radiated energy from an environment outside of said detector;

and converting the received energy into electrical signals representative of said energy; and filtering said electrical signals;

(C) generating a target signal threshold by, finding the most negative electrical signal, smoothing the varying values of the most negative electrical signals so that the variation from sample to sample is reduced and computing the signal threshold using the following formula:

$$\text{Threshold} = A - B \cdot \text{MNS}$$

where: A and B are constants chosen to achieve the desired Probability of false detections;

(D) comparing the filtered electrical signals to the computed target signal threshold;

(E) generating a shape parameter after determining if the most positive peak signal amplitude exceeds the computed threshold value by capturing a packet of signal samples surrounding that peak sample and computing the shape parameter summing the amplitudes of the N nearest neighbor samples divided by the amplitude of the peak sample, where N is a whole number; and (F) comparing said shape parameter with said electrical signal where, if shape parameter value is less than some pre-computed value (Shape A) then the peak signal is rejected as a noise spike, if shape parameter value has a value greater than some pre-computed value Shape B then the peak is considered to be clutter, the threshold value is raised;

(G) repeating steps (A) through (F) during target detection.

* * * * *